(No Model.) 5 Sheets—Sheet 1.

J. G. ROSS.
Heel Finishing Machine.

No. 240,929. Patented May 3, 1881.

WITNESSES: INVENTOR:

(No Model.) 5 Sheets—Sheet 2.

J. G. ROSS.
Heel Finishing Machine.

No. 240,929. Patented May 3, 1881.

WITNESSES: INVENTOR:

(No Model.) 5 Sheets—Sheet 4.
J. G. ROSS.
Heel Finishing Machine.
No. 240,929. Patented May 3, 1881.
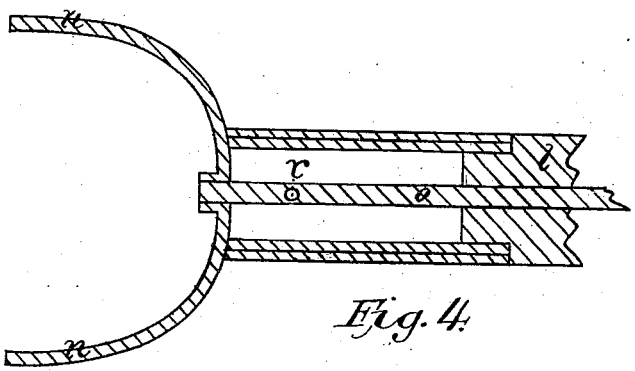
Fig. 4.
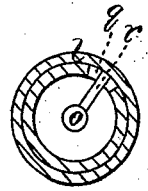
Fig. 5.
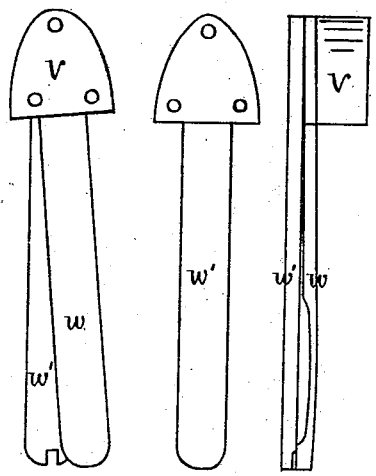
Fig. 6.
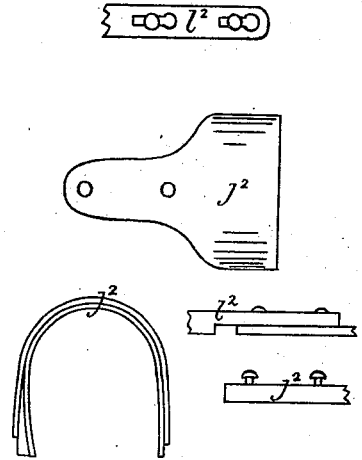
Fig. 7.
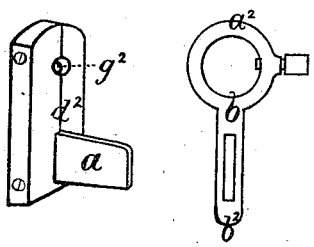
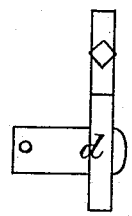
Fig. 8.
WITNESSES:
Wm. H. Goodwin
John P. Kenyan
INVENTOR:
John G. Ross
Per atty
Clifford & Clifford
Wm. H. & Chas. E. Clifford (No Model.)　　　J. G. ROSS.　　5 Sheets—Sheet 5.
Heel Finishing Machine.

No. 240,929.　　　　　Patented May 3, 1881.

WITNESSES:　　　　INVENTOR:

UNITED STATES PATENT OFFICE.

JOHN G. ROSS, OF LYNN, MASSACHUSETTS.

HEEL-FINISHING MACHINE.

SPECIFICATION forming part of Letters Patent No. 240,929, dated May 3, 1881.

Application filed February 5, 1881. (No model.)

*To all whom it may concern:*

Be it known that I, J. G. ROSS, of Lynn, in the county of Essex and State of Massachusetts, have invented certain new and useful Improvements in Heel-Finishing Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
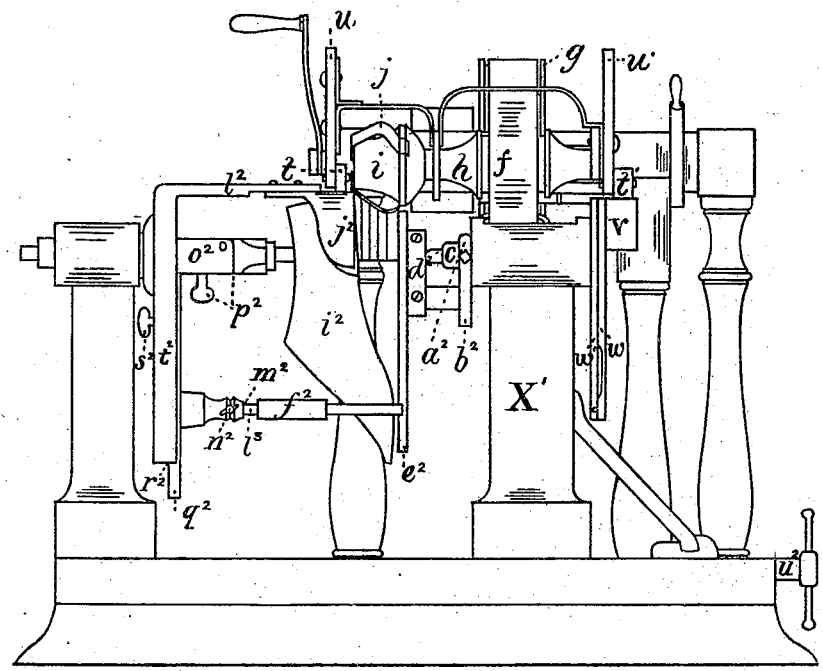
Figure 2:
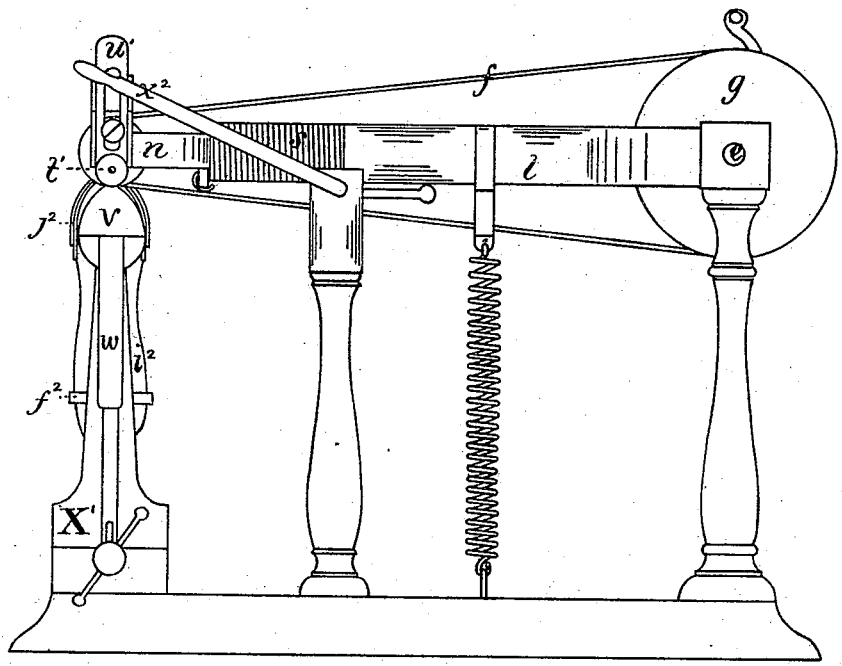
Figure 3:
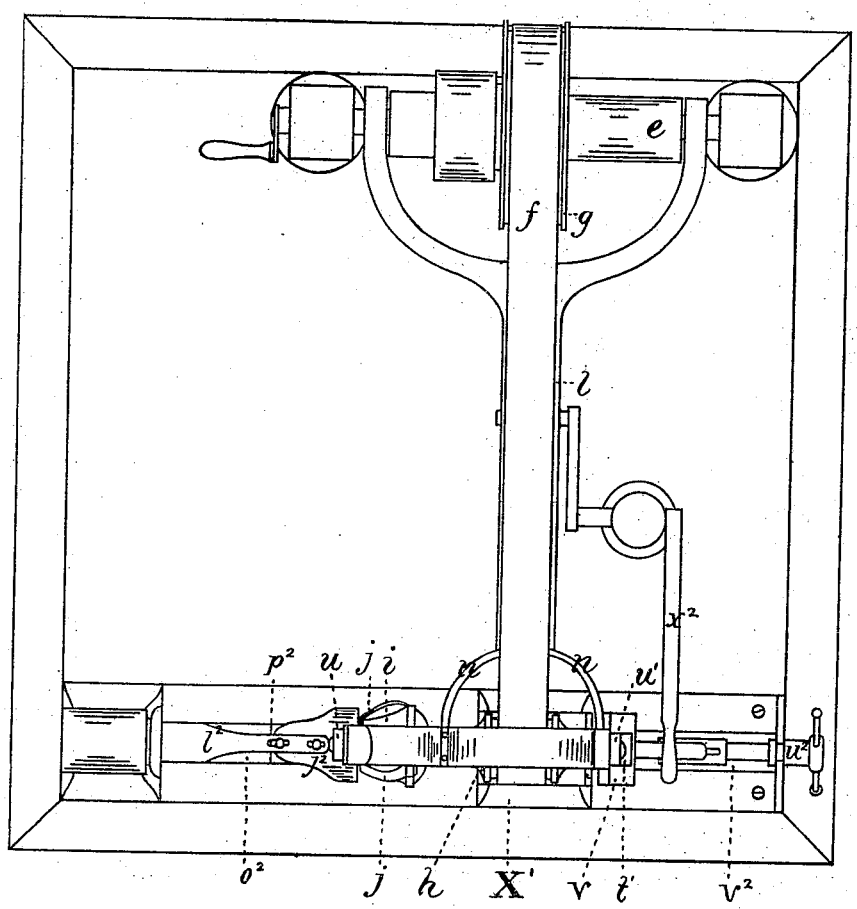
Figure 9:
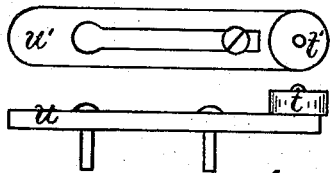
Figure 10:
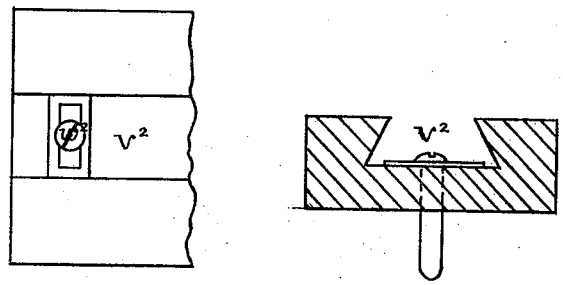
Figure 11:
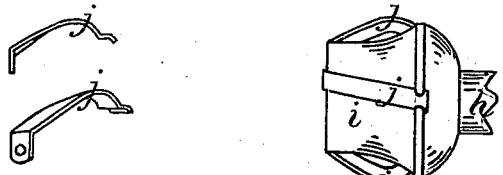
Figure 12:
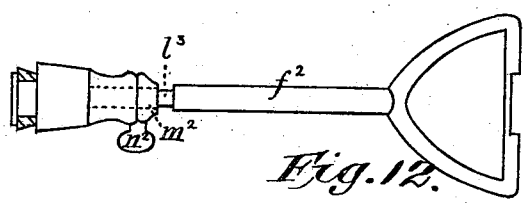

Figure 1 is a front elevation. Fig. 2 is a side elevation. Fig. 3 is a top plan. Fig. 4 is a detail of the rotary swivel-joint with its curved arms which hold the shaft of the cutter, with the spiral spring removed to show the ferrule, spindle, pin, and slot. Fig. 5 is the end of the ferrule, and comprises a view of the slot and pin. Fig. 6 shows three views of the guide-rest for forming the top lift of a heel. Fig. 7 shows details of the heel-band and its holder. Fig. 8 shows four details of the latch and collar, *a* being the latch set in the socket-block; *b*, the collar and latch-socket; *c*, the head-stock shaft with its ball; *d*, a side view of the collar and latch detached from the shaft. Fig. 9 are adjustable holders of the guide-rollers; Fig. 10, part of carriage of head and tail stocks; Fig. 11, views of cutter-head and knives, &c. Fig. 12 is a detached view of the yoke $f^2$ and its shank.

Same letters show like parts.

The object of my invention is to produce a machine for the manufacture or, more exactly, shaping of boot and shoe heels.

My invention consists in the following devices and combinations: First, in an adjustable rotary head set on a spindle so as to tip or turn on said spindle, as herein set forth; second, of a rotary adjustable cutter-head, guide-rolls, and adjustable carriers, as hereinafter described; third, a guide-rest in combination with a guide-roll on the cutter-head; fourth, in a socket-block, a latch, a collar, and a ball-and-socket joint, as herein set forth; fifth, in a combination of a slide, a groove, grooved piece, a yoke, and an adjustable arm, with its set-screw, as herein set forth; sixth, in the combination of a guide-roll and a guide-rest or heel-band, as herein set forth.

*e* shows a shaft, to which power is applied in the usual way. This shaft has a band and pulley, *f g*, by which rotation is imparted to the shaft *h* of the head-stock of the machine. This shaft carries the cutter-head *i*. This head is provided with curved removable knives *j*. These knives are set into recesses in the ends of the cutter-head, and are there secured by set-screws. These knives can be made of any curvature desired, and a set or sets of them designed for use on the cutter-head *i* may be made of such forms or curves as may be required.

*l* is an arm supported on the shaft *e*, and having curves or bifurcations *n*, through which the shaft *h* revolves and in which it is supported. These bifurcations *n* are rigidly connected with a spindle, *o*, passing through a hole in the arm *l*. The shaft *h* is thus capable of turning or being turned or tipped on the spindle *o*, which is capable of turning or rotating in the hole in the arm *l*. A ferrule surrounds the forward end of the arm *l*, and has in it a slot, *q*. In this slot works a pin, *r*, attached to the spindle *o*. Attached to the rear of the bifurcations *n*, and also to the arm *l* at the end of the spindle, is the spiral *s*, which also envelopes the ferrule, Fig. 5. The pin in the slot regulates the extent to which the shaft *h* can be inclined or tipped, and the spiral *s* tends to hold the shaft in a horizontal position. Two guide-rolls, *t t'*, are attached one to each end of the shaft *h*, and are adjustable up or down by two slotted holders, *u u'*, and proper set-screws, as illustrated in the detail, Fig. 9.

Fig. 6 shows a guide-rest for forming the top-lift of a heel. This device receives the roller *t'*, and is intended to make what are designated as "right" and "left" heels, or heels with an outside curve so enlarged or modified as to fit right and left shoes. It is composed of the head or guide *v* and two levers or arms, *w w'*. The head *v* is on the arm *w*. The outside arm, *w*, has a pin or other equivalent device on its inner face, to fit into holes on the contiguous face of the inner arm, *w'*, so as to hold the outer arm to any adjustment. It is manifest that the head *v* can be turned to one or the other side as its arm *w* is swung. This head *v*, being a guide to the shaft of the cutter-head *i*, will give such contour to the heels or such increased curvature or bulge on one side more than on the other as may be desired. This guide-rest (seen in the details, Fig. 6) is set on a shaft, $c$, through the standard X'. On the other end of this shaft is the collar $a^2$, which is secured in place by its set-screw, as seen in the detail, Fig. 8. Projecting from this collar, at the bottom, is a slotted piece to serve as a latch, $b^2$, to the tongue $a$, projecting from the socket-block $d^2$. This socket-block has the arm $e^2$, which fits, at its lower end, into a recess in the end of the yoke $f^2$.

It will be understood that as the heel is submitted to the operation of the cutter-head $i$ it is turned by the workman so that the rear and both sides shall be properly cut and shaped. This will be hereinafter more fully described. It is now alluded to merely to show that when the heel is thus turned to the knives of the cutter-head the guide-rest $v$ is also turned by means of the devices just referred to above— to wit: shaft $c$, collar $a^2$, latch $b^2$, tongue $a$, arm $e^2$, and yoke $f^2$. So the cutter-head gives a greater or less curve or bulge to one or the other side of a heel as the shaft $h$ is raised or allowed to drop by the guide-rest $v\,w\,w'$, which rotates exactly as the heel is turned.

The socket-block $a^2$ is in two parts, as illustrated in the detail, Fig. 8, and is secured by screws. It has the socket $g^2$, to receive the ball $h^2$ on the end of the shaft $x$. This admits of the proper movements of the socket-block and the arm $e^2$, and permits the adjustments of the guides connected with the shaft $x$ in an exact line with the device to hold the heel to be shaped, which device I am about to describe in detail.

The heel to be shaped, being applied to a boot or shoe, $i^2$, is held by the heel-band $j^2$ and the yoke $f^2$, already referred to. The heel-band or guide-rest has the holes, as seen in the detail, Fig. 7, to receive set-screws passing through the slots in the arm $l^2$, forming a bayonet-joint, and permitting of the movement and adjustment forward and back of the heel-band, as may be required. The guide-roll $t$ runs on this band $j^2$. The band is composed of two layers, one over the other, and the outer one is capable of being sprung or set off from the inner or under one by a wedge being passed in between them. Such a device will control the action of the cutters of the cutter-head in this particular, that in proportion as the outer layer of the guide-rest or heel-band is set off the heel will be wider at the front end. The toe of the boot or shoe is held, as before named, by the yoke $f^2$. The shank $l^3$ fits a socket, $m^2$, where it is held by the set-screws $n^2$. Thus the toe of the last or form can be pushed out or drawn back, as desired, or the form or last kept in a vertical position. The heel end of the boot or shoe is held by the bar $o^2$. This is connected with a joint and adjusting-screw, $p^2$, so that the heel of the boot, &c., can be tipped and held exactly to correspond with the manner in which the toe is placed and held by the yoke $f^2$. This combination is to effect the manner and form of the cut into the heel. Tipping up the heel or throwing out the toe of the boot, &c., makes the knives of the cutter-head reduce the size of the bottom, and drawing in the toe of the boot, &c., would make the knives take deeper into the crown or top lift or lifts of the heel. Thus its shape is effected by this combination. The jointed piece and screw $p^2$ and the yoke $f^2$ are fastened to a slide, $q^2$, which moves into place in the groove $r^2$, and is there held by the tightening-screw $s^2$. The device composed of the slide, the yoke, the jointed arm, and screw is taken from the machine, the boot, &c., put on with the heel attached, and, when adjusted in the machine, the cutter-head operates upon the heels as fast as they are put in place on the machine.

The device composed of the slide, the grooved piece $t^2$, the yoke $f^2$, and heel-band or guide-rest I call the "tail-stock" of the machine. The standard X' is adjustable toward and from the tail-stock by the screw $n^2$, and the standard moves in the way $v^2$. The bed-piece in which the way $v^2$ is made is adjustable at right angles to the movements of the standard X' by a slot and set-screw $w^2$.

$x^2$ is a lever for raising the cutter-head out of action on a heel. The knives of the cutter-head $i$ can be so arranged as to incline a little, or be in a diagonal to the axis of the head, and thus make a drawing cut on the heel.

The shaft $h$ is sometimes so inclined as to make a very steep pitch at the rear of the heel. In this case the knives cut deeply into the bottom of the heel, and if the cut were carried in the same way all around the heel the bottom or tread of it would be two small; it would be too narrow at the front edge. This illustrates a use of the band $j^2$. By setting it off by the wedge, as hereinbefore suggested, the desired width of the heel at its front end can be preserved.

What I claim, and desire to secure by Letters Patent, is—

1. The combination of the cutter-head $i$ and its shaft with the spindle $o$, slot $q$, pin $r$, and spring $s$, as herein set forth.

2. The rotary adjustable cutter-head $i$ with its guide-rolls $t\,t'$ and their adjustable carriers $u\,u'$, as herein set forth.

3. The guide-rest $v\,w\,w'$, for forming the top lift of the heel, in its combination with a guide-roll, $t'$, on the cutter-head, as herein set forth.

4. The socket-block $d^2$, in two parts, the latch, the collar $a^2$, the slotted part $b^2$, and the ball-and-socket joint, all combined as herein set forth.

5. The combination of the slide $q^2$, groove $r^2$, grooved piece $t^2$, yoke $f^2$, and adjustable part $o^2$, and its screw $p^2$, as herein set forth.

6. The combination of the guide-roll $t$ and carrier $u$ with the guide-rest or heel-band, as herein set forth.

In testimony that I claim the foregoing as my own I affix my signature in presence of two witnesses.

JOHN G. ROSS.

Witnesses:
THOMAS H. RONAYNE,
ROLLIN E. HARMON.